United States Patent
Buchheit et al.

(10) Patent No.: US 8,562,262 B1
(45) Date of Patent: Oct. 22, 2013

(54) DRILL BLOCK ALIGNMENT AND SELECTION OF CUTTER DIAMETER FOR REPAIR OF THROUGH-HOLE

(75) Inventors: Jack Gerard Buchheit, Kirkwood, MO (US); Dick Sellers, Byron, GA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 13/184,471

(22) Filed: Jul. 15, 2011

(51) Int. Cl.
*B23B 35/00* (2006.01)

(52) U.S. Cl.
USPC ....... 408/1 R; 408/75; 408/115 R; 29/402.01; 29/407.09; 29/407.1

(58) Field of Classification Search
CPC ................................ B23B 49/00; B23B 49/02
USPC ........ 408/1 R, 75, 115 R; 29/402.01, 407.09, 29/407.01; 33/501.45, 542, 555.1
See application file for complete search history.

(56) References Cited

U.S. PATENT DOCUMENTS

| | | | | |
|---|---|---|---|---|
| 3,838,935 A * | 10/1974 | Boyajian | | 408/75 |
| 4,270,259 A * | 6/1981 | Tichy et al. | | 29/402.06 |
| 4,790,079 A * | 12/1988 | Meyers | | 33/517 |
| 5,297,905 A | 3/1994 | Schmidt et al. | | |
| 6,238,149 B1 * | 5/2001 | Hollinger et al. | | 408/30 |
| 2009/0095840 A1 | 4/2009 | Roux et al. | | |
| 2010/0301536 A1* | 12/2010 | Wilson et al. | | 269/53 |

* cited by examiner

*Primary Examiner* — Daniel Howell
*Assistant Examiner* — Ryan Rufo
(74) *Attorney, Agent, or Firm* — Hugh P. Gortler

(57) ABSTRACT

A drill block is aligned and a cutter diameter selected to repair a through-hole in a part. The hole has a nominal diameter. A pin having a less-than-nominal diameter is inserted into the hole, with a bushing on the pin placed over the hole at a first side of the part, the bushing having an outer diameter that is greater than the nominal diameter. Light is shone on the hole. A drill block engaging the pin is positioned to move the pin and the bushing until no light shines past the bushing.

14 Claims, 7 Drawing Sheets

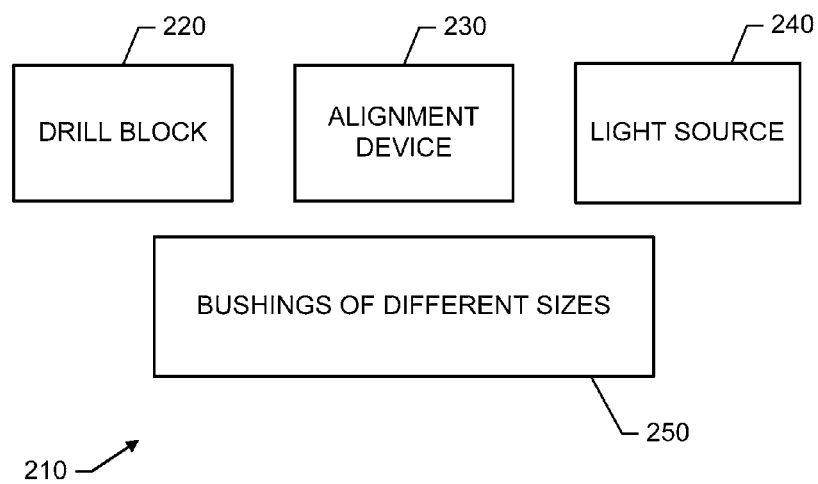
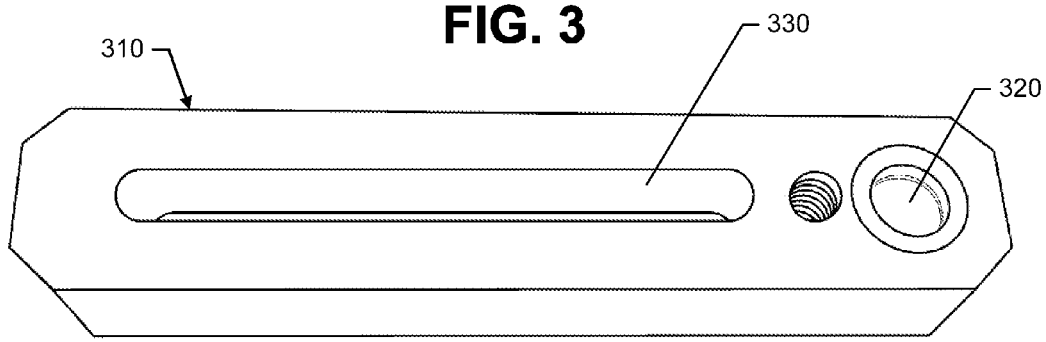

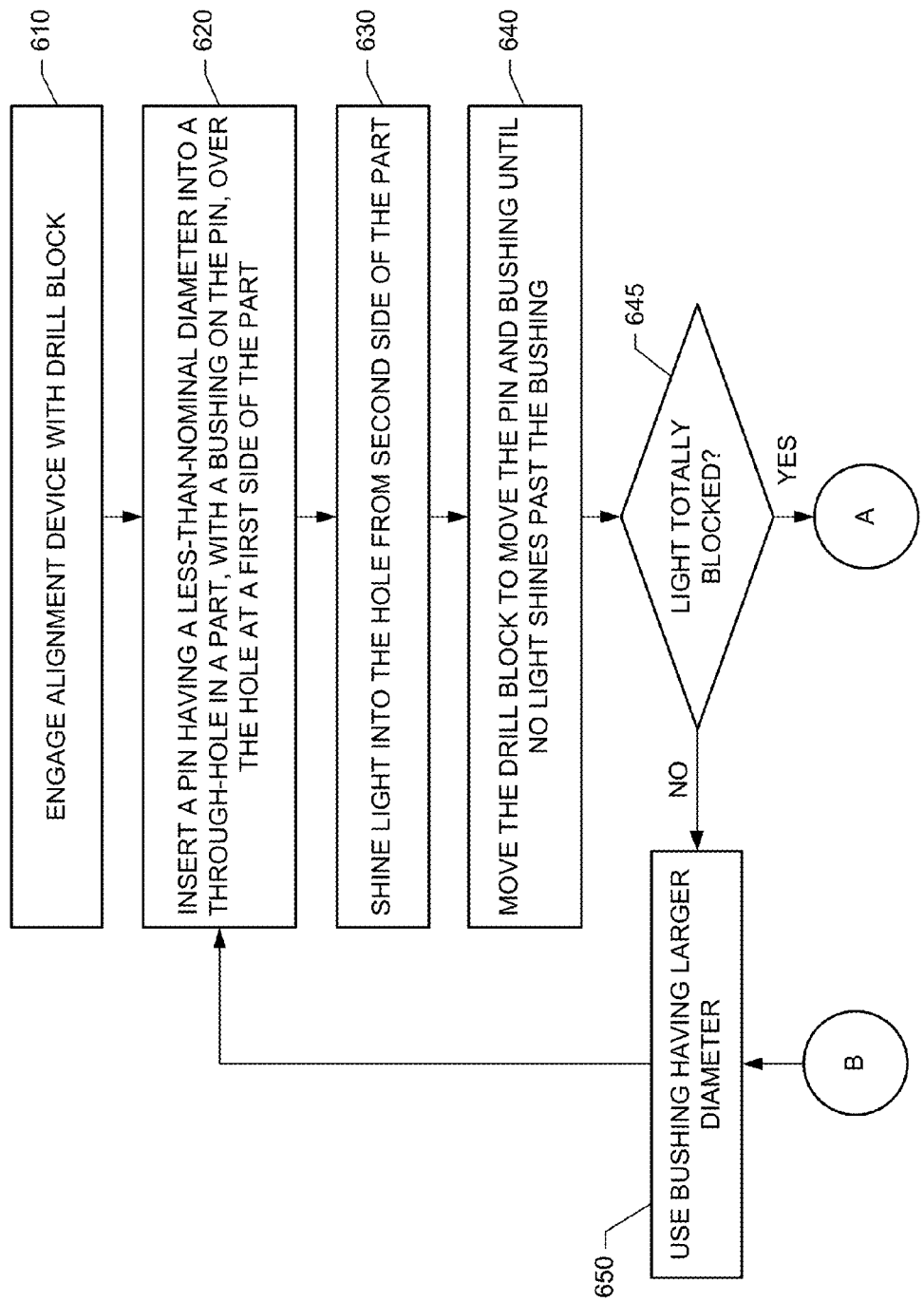

DRILL BLOCK ALIGNMENT AND SELECTION OF CUTTER DIAMETER FOR REPAIR OF THROUGH-HOLE

This invention was made with Government support under contract number FA820207D0004 awarded by the United States Air Force. The government has certain rights in this invention.

BACKGROUND

Thousands of holes are drilled in military and commercial aircraft to facilitate fastener installation. Fastener installation tolerances in military and commercial aircraft are very tight.

Out of tolerance holes can occur during manufacture of an aircraft. For instance, tolerances might be exceeded due to angularity of holes extending through a part (more prevalent in thicker parts) and mis-shaped holes.

During service of an aircraft, holes can become damaged and out of tolerance. For instance, hole shapes can change during service. These damaged and out of tolerance holes must be repaired to precise requirements in order for the aircraft to remain in service.

Damaged and out of tolerance holes may be repaired using a cutter (e.g., a drill bit, a reamer) and drill block. The drill block is positioned on a part, and aligns and guides the cutter to drill out the hole. If the hole is still out of tolerance after drilling (that is, the cutter doesn't clean-up all of the damaged area), the process is repeated with a larger cutter. The drilling is repeated until the hole is within tolerance, or until the hole is bushed, or until the part is scrapped.

This repair process is very tedious, especially for hard-to-drill materials. As many as two to three hours can be taken to repair a single hole, and hundreds or thousands of holes might have to be repaired on a single aircraft.

It is highly desirable to process a repair hole only once, and not have to drill more than once. Much time would be saved. Moreover, re-drilling would be avoided. If a part has to be re-drilled, that part might have a reduced life expectancy or it might have to be scrapped.

SUMMARY

According to an embodiment herein, a method comprises aligning a drill block and selecting a cutter diameter to repair a through-hole in a part. The hole has a nominal diameter. A pin having a less-than-nominal diameter is inserted into the hole, with a bushing on the pin placed over the hole at a first side of the part, the bushing having an outer diameter that is greater than the nominal diameter. Light is shone on the hole. A drill block engaging the pin is positioned to move the pin and the bushing until no light shines past the bushing.

According to another embodiment herein, a method comprises placing a head of an alignment device in a guide hole of a drill block; placing a bushing over a pin of the alignment device; positioning the drill block on a first side of an aircraft part such that the pin extends into a through-hole in the part and the bushing abuts against the part, over the through-hole; shining a light into the through-hole at the second side of the part; and positioning the drill block on the part until no light shines past the bushing. The method further comprises removing the alignment device and the bushing; re-inserting the alignment device with the bushing on the pin, covering the through-hole at the second side of the part; shining a light into the hole at the second side of the part; and determining whether light shines past the bushing to the first side. If the light is blocked, the through-hole is repaired with a cutter having a diameter equal to an outer diameter of the bushing.

According to another embodiment herein, an apparatus comprises an aircraft part having a through-hole of a nominal diameter; a drill block having a guide hole over the through-hole, the guide hole having a larger diameter than the through-hole; an alignment device including a pin extending through the through-hole and a head within the guide hole, the pin having smaller than the nominal diameter; and a bushing on the pin, covering the through-hole at one side of the part.

BRIEF DESCRIPTION OF THE DRAWINGS

FIG. 2 is an illustration of a set of tools for aligning a drill block and selecting a cutter diameter to repair a through-hole in a part.
FIG. 3 is an illustration of a drill block.
FIGS. 6a and 6b are illustrations of a method of repairing a through-hole in a part.

DETAILED DESCRIPTION

Figure 1A:
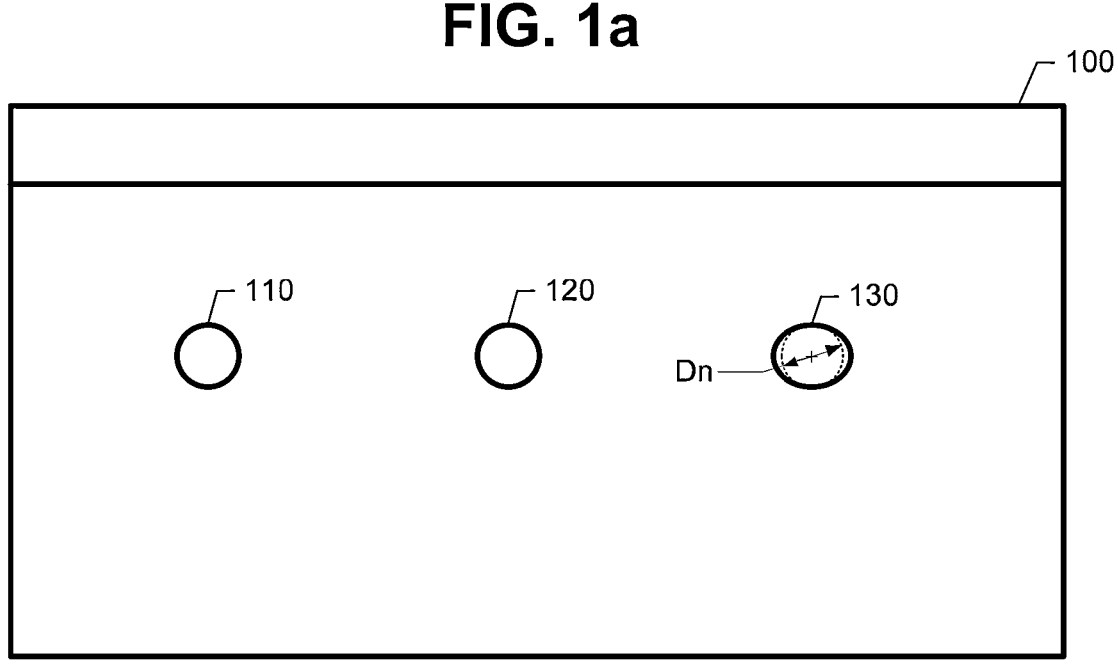
FIGS. 1a and 1b are illustrations of a through-hole in a part.
Figure 1B:
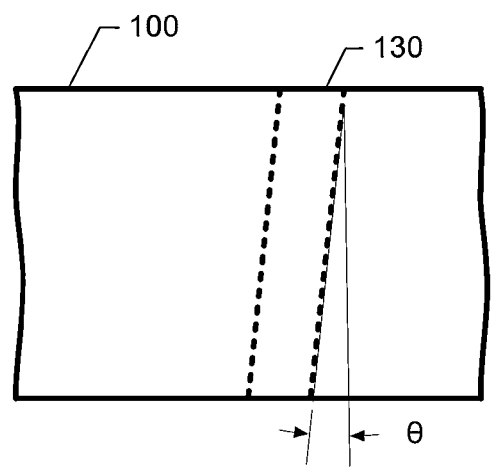

Reference is made to FIGS. 1a and 1b, which illustrate holes 110, 120 and 130 in a part 100. As shown in FIG. 1a, one of the holes 130 has a nominal diameter Dn, but has an elliptical shape due to service. As shown in FIG. 1b, angularity of that hole 130 is out of tolerance by a small angle θ.

Reference is made to FIG. 2, which illustrates a set of tools 210 for repairing a through-hole in a part. The tools 210 include a drill block 220, an alignment device 230, a light source 240 (e.g., a flashlight), and a set of bushings 250.

An example of a drill block 220 is illustrated in FIG. 3. The drill block 310 of FIG. 3 includes a guide hole 320 for aligning and guiding a cutter. The drill block 310 also includes a slot 330 for exposing other holes on the part. A clamp may be inserted over the drill block 310 and fastened to the part via the exposed holes.

Figure 4:
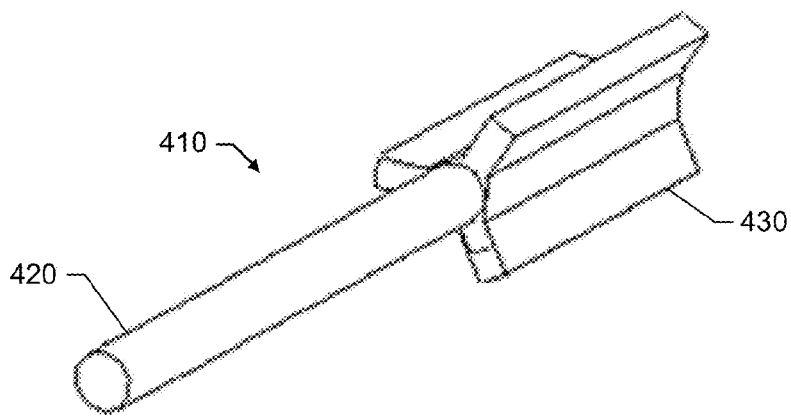
FIG. 4 is an illustration of an alignment device.

An example of an alignment device 230 is illustrated in FIG. 4. The alignment device 410 of FIG. 4 includes a pin 420 and a head 430. The pin 420 has diameter that is less than nominal so that it can be slid into the through-hole. The head 430 is configured to be seated in the guide hole 320 of the drill block 310.

Figure 5A:
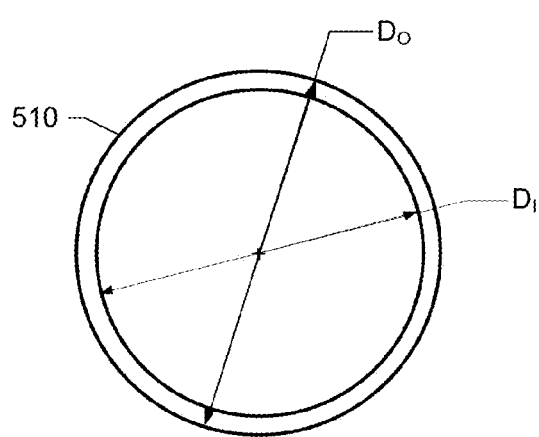
FIGS. 5a and 5b are illustrations of a bushing.
Figure 5B:
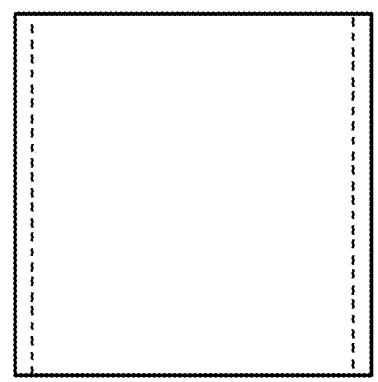

An example of a bushing 250 is illustrated in FIGS. 5a and 5b. Each bushing 510 has an inner diameter $D_I$ that enables the bushing 510 to be slip-fitted onto the pin of the alignment device 230. The different bushings 510 in the set have different outer diameters $D_O$, all of which are greater than the nominal diameter of the through-hole. Each outer diameter $D_O$ corresponds to the diameter of a cutter for repair cutting the through-hole.

Figure 6B:
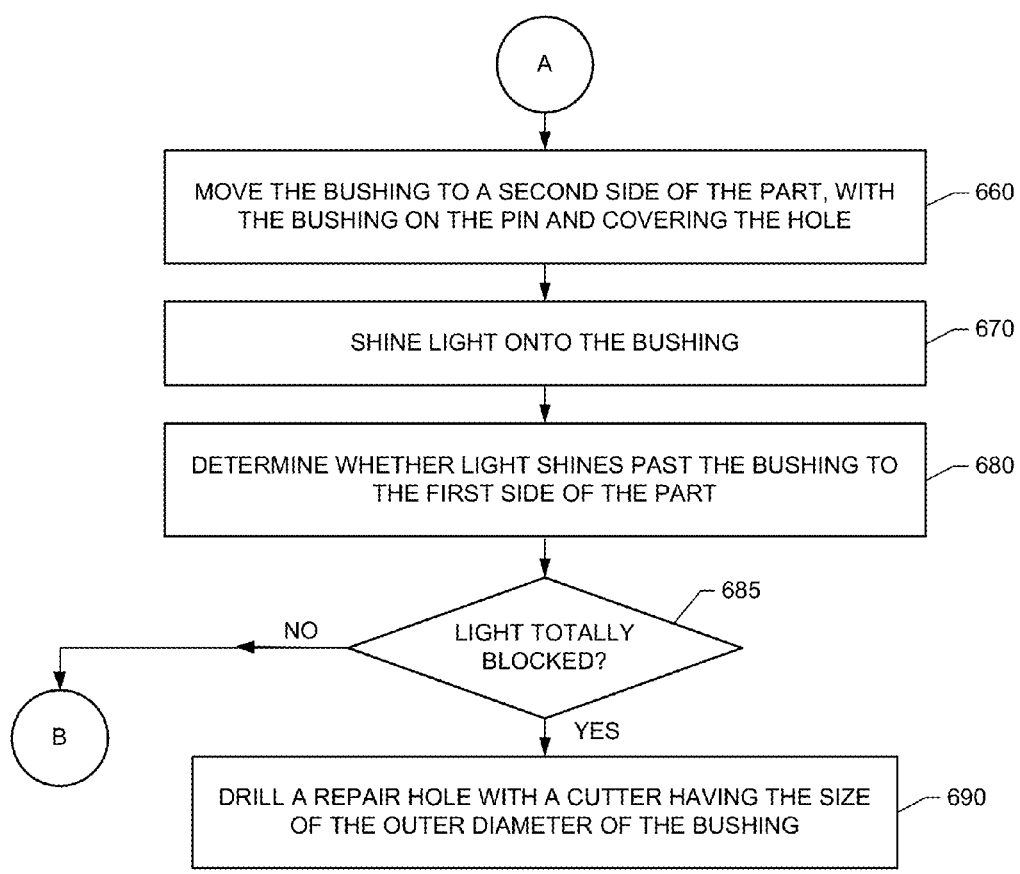

Reference is now made to FIGS. 6a and 6b, which illustrate a method of repairing a through-hole in a part. At block 610, an alignment device is engaged with a drill block. The alignment device has a pin that is inserted through a guide hole in the drill block, and a head that is seated in the guide hole.

Figure 7A:
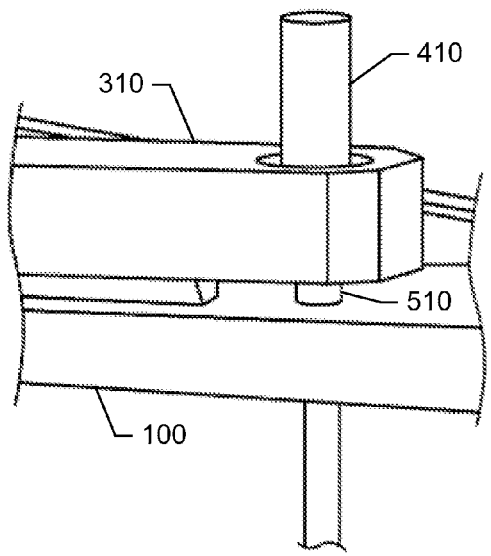
FIG. 7a-7c are illustrations of the drill block, bushing and alignment device as they are used to align the drill block and determine a final diameter of a cutter for repairing a through-hole in a part.

At block 620, a bushing is selected from the set, and slip fitted onto the pin. The pin is inserted into the through-hole until the drill block rests on the part (see FIG. 7a). Thus, the bushing is placed over the hole at a first side of the part. The selection of the bushing is based on an estimate as to the smallest diameter bushing that can completely cover the through-hole on both sides of the part.

At block 630, light is shone into the through-hole. The light may be provided by a flashlight or other light source, which is positioned at a second (opposite) side of the part.

Figure 7B:
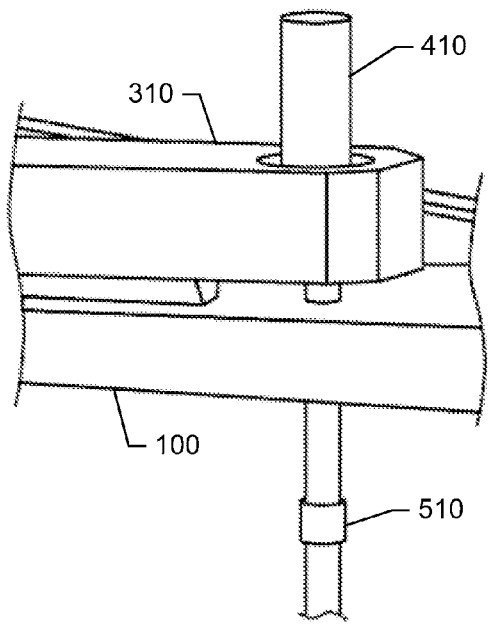
Figure 7C:
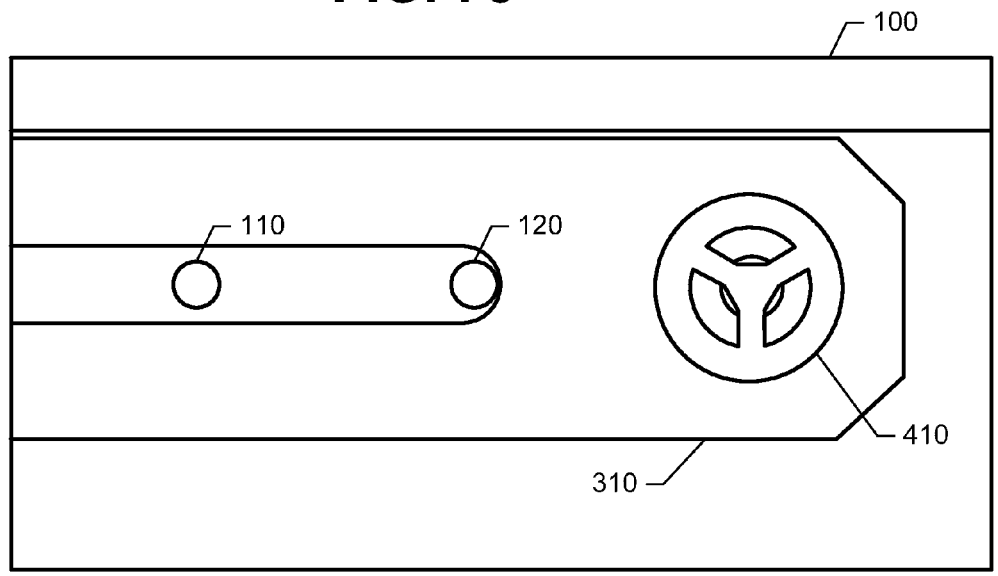

At block 640, a visual observation is made by looking down through the guide hole of the drill block to see whether any light is shining past the bushing (see FIG. 7c). If any light shines past the bushing, the drill block is repositioned (whereby the pin and bushing are also repositioned) until no light shines past the bushing.

The head of the alignment device is configured to allow the light blockage to be observed. The head may have three radially-extending prongs (see, for example, FIGS. 4 and 7c). Such a head may be rotated to fully view the bushing.

If the bushing cannot be moved to a position that totally blocks the light (block 645), then the bushing is replaced with a larger-diameter bushing (block 650). The inserting (block 620), the shining (block 630), and the positioning (block 640) are repeated with the larger diameter bushing.

Once a bushing is found that can totally block the light, then at block 660, the position of the drill block is set (e.g., the drill block is clamped to the part), and the bushing is moved to the second side of the part (see FIG. 7b). The bushing may be moved, for instance, by disengaging the alignment device from the drill block without shifting position of the drill block. As the pin is withdrawn, the bushing slides off the pin and is removed from between the tool and the block. The alignment device is then re-engaged with the drill block, and the bushing is slip-fitted over the pin at the second side of the drill block. The bushing is pushed against the part, whereby the bushing covers the hole from the second side of the part.

At block 670, the light source is positioned at the second side of the part, and light is shone onto the bushing. At block 680, an observation is made as to whether light shines past the bushing to the first side. If the light is not totally blocked (block 685), the bushing is replaced with a larger-diameter bushing (block 650), and the inserting (block 620) and subsequent steps are repeated with the larger diameter bushing.

If the light is totally blocked (block 685), then a repair cutter size and drill block position have been found. In this manner, optimum cutter diameter and optimum position of the drill block are determined prior to repair cutting.

At block 690, the optimum cutter diameter and drill block position are used to repair cut the through-hole. This method enables a through-hole to be repaired by the smallest available cutter.

A method herein is not limited to the exact sequence of functions illustrated in FIGS. 6a and 6b. In some embodiments, a cutter diameter and drill block position may be determined by performing only the functions at blocks 610 to 645 (that is, positioning the bushing with respect to one side only). In some embodiments, the drill block may be rested on the first side of the part, but adjusted with the bushing on the second side of the part. In some embodiments, the drill guide may be rested on a structure other than the part.

The drill block is not limited to the block illustrated in FIG. 3. FIG. 3 illustrates but one embodiment of a drill block.

The alignment device is not limited to the device illustrated in FIG. 4. FIG. 4 illustrates but one embodiment of an alignment device.

Figure 8:
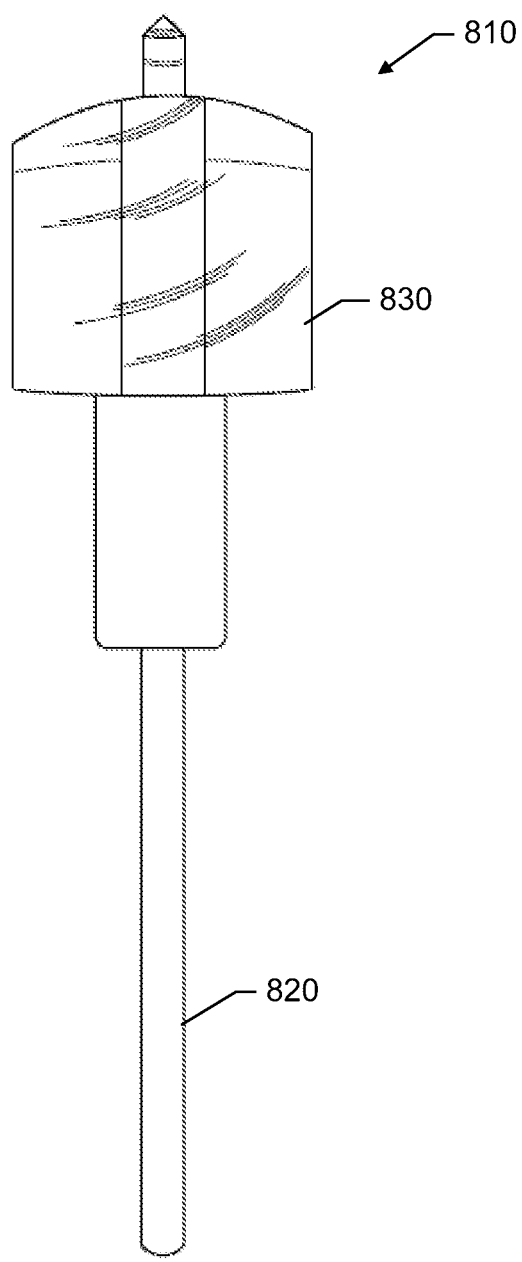
FIG. 8 is an illustration of an alternative alignment device.

Reference is now made to FIG. 8, which illustrates another embodiment of an alignment device 810. The alignment device 810 of FIG. 8 includes a pin 820 and a head 830. The head 830 is made of a light-transmissive material such as acrylic. In contrast to the head of FIG. 4, which has to be rotated in order to observe light blockage, the head 830 of FIG. 8 does not have to be rotated.

The invention claimed is:

1. A method comprising aligning a drill block and selecting a cutter diameter to repair a through-hole in a part, the hole having a nominal diameter, the aligning and selecting including:
   inserting a pin having a less-than-nominal diameter into the hole such that a bushing on the pin is over the hole at a first side of the part, the bushing having an outer diameter that is greater than the nominal diameter;
   shining light on the hole; and
   positioning a drill block engaging the pin to move the pin and the bushing until no light shines past the bushing.

2. The method of claim 1, wherein if the bushing cannot be moved to a position that totally blocks the light, then the bushing is replaced with a larger-diameter bushing; and the inserting, the shining and the positioning are repeated with the larger diameter bushing.

3. The method of claim 1, wherein the bushing covers the hole at a first side of the part; wherein the drill block is placed over the bushing and the pin;
   wherein the hole is illuminated at a second side of the part; and wherein the drill block is positioned so light does not shine from the second side to the first side.

4. The method of claim 1, further comprising:
   moving the bushing to a second side of the part, with the bushing on the pin and covering the through-hole;
   shining light onto the bushing at the second side of the part; and
   determining whether light shines past the bushing to the first side.

5. The method of claim 4, wherein moving the bushing to the second side includes removing the pin and the bushing from the pin without shifting position of the drill block; and re-inserting the pin in the hole with the bushing on the pin such that the bushing covers the hole from the second side of the part.

6. The method of claim 4, wherein if the bushing does not totally block the light, then the bushing is replaced with a larger-diameter bushing and the inserting the bushing over the hole at the first side and the subsequent steps are repeated.

7. The method of claim 6, wherein the bushing diameter is stepped up until a bushing is found that can block light from both sides of the part, whereby repair cutter size and drill block position are known before the through-hole is repair cut.

8. The method of claim 7, further comprising using the drill block and a cutter to repair the hole, wherein the cutter has a size of the outer diameter of the smallest bushing that can fully block light, whereby the hole is repaired by the smallest cutter.

9. The method of claim 1, further comprising repairing the hole with a cutter having a size equal to an outer diameter of the bushing.

10. The method of claim 1, wherein the part is an aircraft part.

11. A method comprising:
   placing a head of an alignment device in a guide hole of a drill block;
   placing a bushing over a pin of the alignment device;
   positioning the drill block on a first side of an aircraft part such that the pin extends into a through-hole in the part and the bushing abuts against the part, over the through-hole;

shining a light into the through-hole at the second side of the part;
positioning the drill block on the part until no light shines past the bushing;
removing the alignment device and the bushing;
re-inserting the alignment device with the bushing on the pin, covering the through-hole at the second side of the part;
shining a light into the hole at the second side of the part;
determining whether light shines past the bushing to the first side; and
if the light is blocked, repairing the through-hole with a cutter having a diameter equal to an outer diameter of the bushing.

12. Apparatus comprising:
an aircraft part having a through-hole of a nominal diameter;
a drill block having a guide hole over the through-hole, the guide hole having a larger diameter than the through-hole;
an alignment device including a pin extending through the through-hole and a head within the guide hole, the pin having smaller than the nominal diameter; and
a bushing on the pin, covering the through-hole at one side of the part.

13. The apparatus of claim 12, wherein the head includes a cylinder made of clear plastic.

14. The apparatus of claim 12, wherein the head includes three radially-extending prongs.

\* \* \* \* \*